April 19, 1966 D. F. MALKIEWICZ 3,246,517
TRANSDUCER SYSTEM
Filed July 15, 1963 2 Sheets-Sheet 1
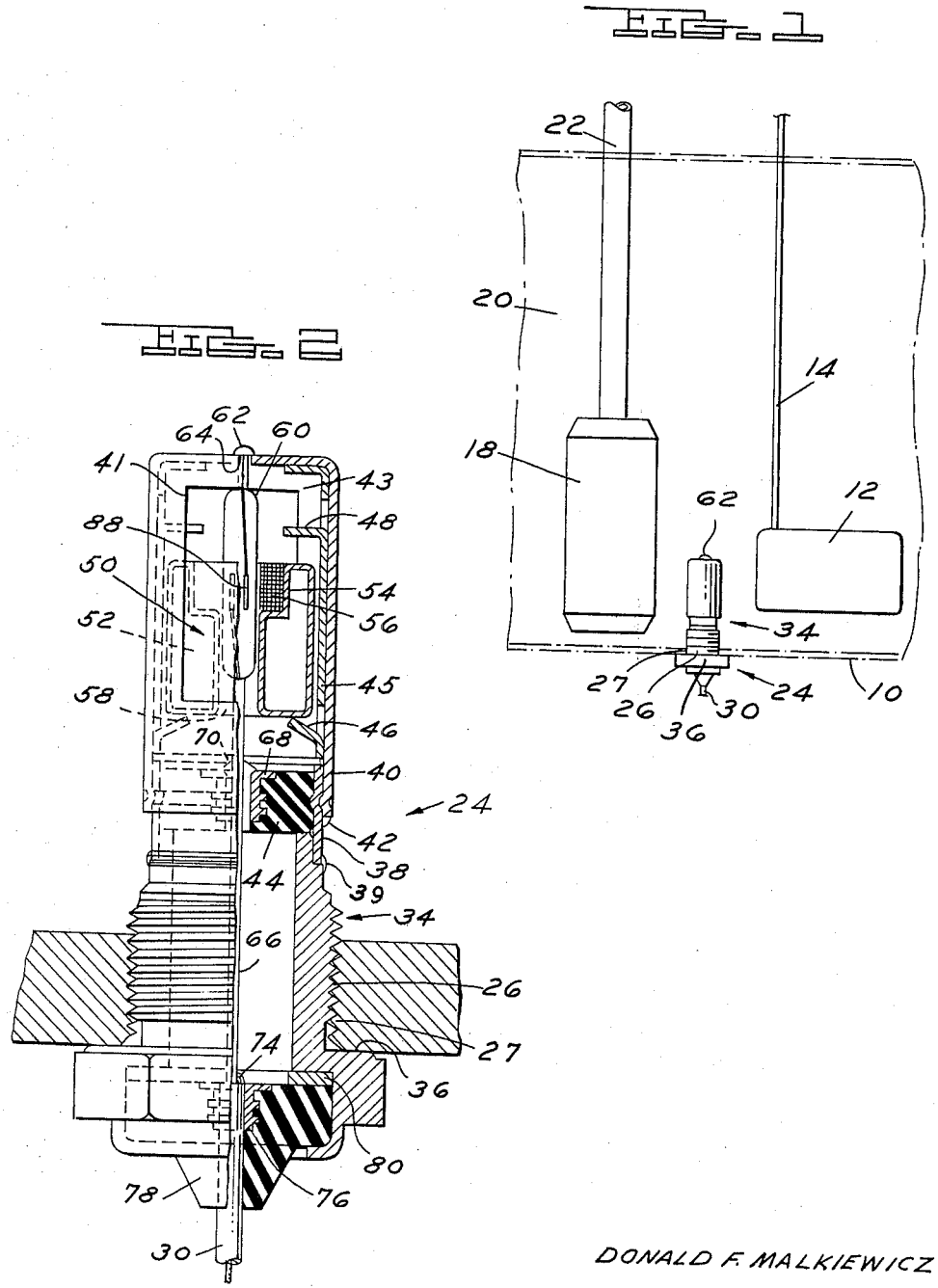
DONALD F. MALKIEWICZ
INVENTOR.
BY John R. Faulkner
Stuart Lubitz
ATTORNEYS

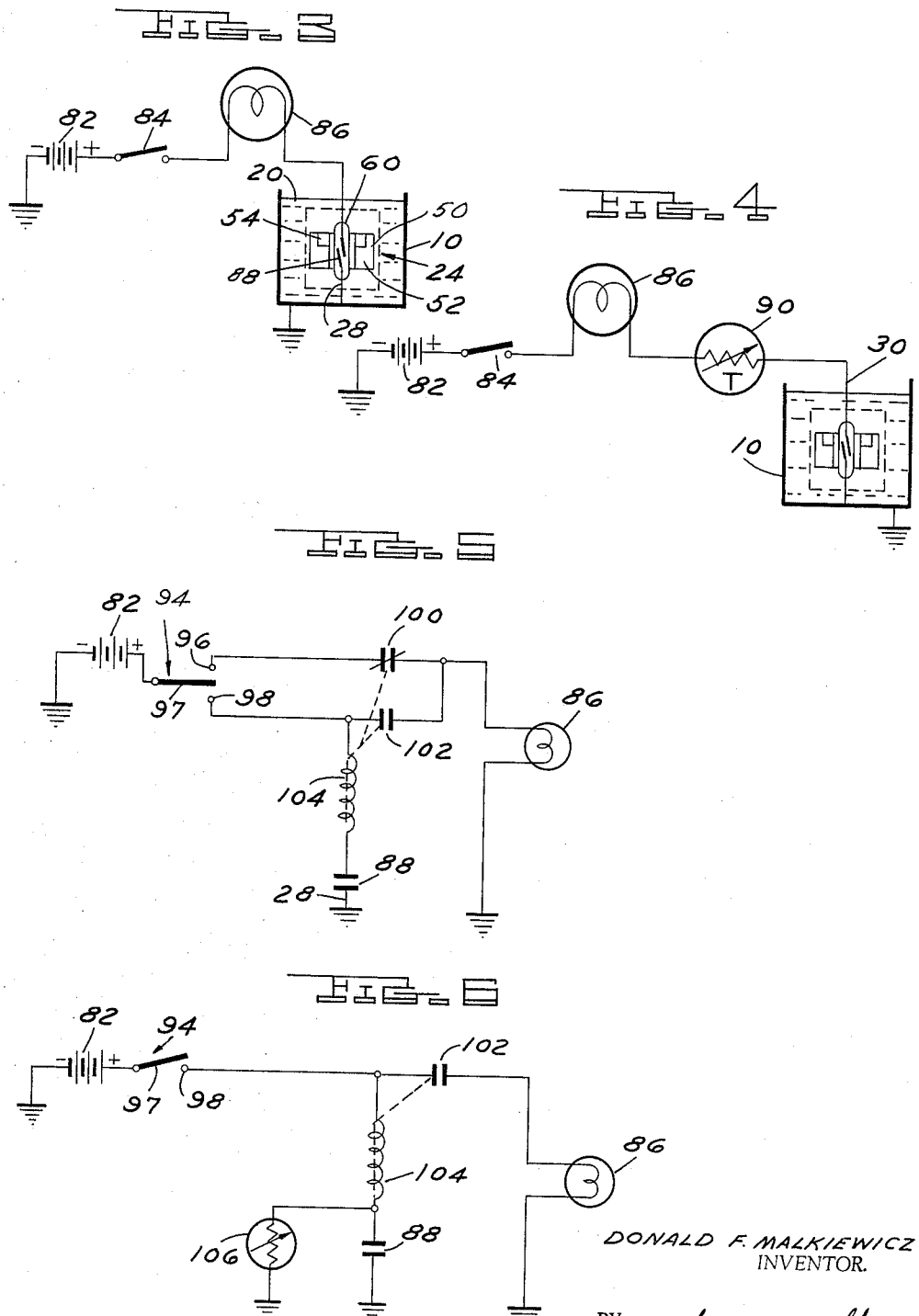

United States Patent Office 3,246,517
Patented Apr. 19, 1966

3,246,517
TRANSDUCER SYSTEM
Donald F. Malkiewicz, Madison Heights, Mich., assignor to Ford Motor Company, Dearborn, Mich., a corporation of Delaware
Filed July 15, 1963, Ser. No. 295,150
2 Claims. (Cl. 73—308)

This invention relates to a transducer and more particularly to a transducer and system that indicates the level of a liquid. The specific purpose of this invention is to provide a simple, compact, safe and reliable transducer and system that will sense high or low liquid levels. The liquid sensed may be the oil, fuel, or coolant in an automotive vehicle.

Generally the system of this invention includes a transducer or magnetic probe means having a toroidal sensing or magnetic float means that surrounds and slides on an encased magnetic reed switch. The sliding movement of the float means is caused by the movement of the liquid or other condition that is being sensed. This movement of the magnetic float means over the switch causes the magnetic reed switch to open or close depending on the particular system. The actuation of the reed switch will energize or de-energize other circuit elements and an indicating means.

The specific structure of this invention will be understood when the detailed description is read in conjunction with the drawings wherein:

FIGURE 1 is a diagrammatic drawing showing a portion of a fuel tank or liquid reservoir with the transducer secured therein;

FIGURE 2 is an elevational view of the transducer with a portion shown in section;

FIGURE 3 is a simplified circuit diagram that demonstrates the principle of the liquid level system;

FIGURE 4 is a simplified circuit diagram that demonstrates the principle of a liquid level system including a time delay means;

FIGURE 5 is a circuit diagram of a liquid level system specifically adapted for use in a motor vehicle; and FIGURE 6 is a circuit diagram of an alternate embodiment of a liquid level system adapted for use in a motor vehicle.

Referring to FIGURE 1, a fluid reservoir or fuel tank 10 is shown containing the usual float 12 that is connected to a link 14 that is connected by way of additional linkages (not shown) to a fuel indicator. The fuel tank 10 also houses a filter 18 which filters the fluid or gasoline 20 that may be transported to the carburetor system of the automotive vehicle (not shown) by the metal tube 22. It should be understood that the fluid or liquid reservoir 10 may be an oil pan, coolant reservoir or any other tank.

A transducer or magnetic probe means 24 is mounted at a selected level in the tank 10 by a threaded portion 26 of the housing 34 that threadingly engages the tapped hole 27 in tank 10. The threaded connection effectively grounds the housing 34 since the tank 10 is connected to ground. A conductor 30 connects the transducer 24 to an electrical circuit which will be described later in the specification. The transducer 24 is shown in detail in FIGURE 2. It includes a housing 34 that comprises a lower casing or housing 36 which is attached to an inner or intermediate casing or housing 38 by the circumferential solder joint 39. An outer or upper casing or housing 40 is attached to the intermediate casing 38 by a solder joint 42. The upper casing 40 has two window portions or openings 41 and 43 for permitting fluid to enter and exit from the housing. The housing 36, 38 and 40 are made from a conductive material such as brass or copper. The fastening of the lower casing 36, the intermediate casing 38 and the upper casing 40 provides an electrical circuit path from the upper casing 40 to the lower casing 36 which is connected to ground via the threaded portion 26 and tank 10.

The intermediate casing 38 has a float limit means 45 located adjacent to it. The float limit means 45 includes a first or lower limit means or tabs 46 punched from its surface to protrude into the housing. A second or upper limit means or tabs 48 are also punched from the surface of the float limit means 45 to protrude into the housing. It should be noted that the float limit means 45 may be made integral with casing 38 or 40.

The first and second limit means 46 and 48 limit the extent of movement of a sensing means or magnetic float means 50. This sensing means comprises a toroidal ring float 52. The word "toroidal" as used in this specification refers to an element having a closed path while the phrase "toroidal ring" refers to an element having a closed circular path or configuration. The toroidal float 52 may be hollow as shown or solid and made from a buoyant material such as a plastic foam. The float 52 has a supporting cup portion 54 that receives a magnetic means 56 which may take the form of a permanent magnet ring, horseshoe or segment. The float 52 is spaced from the interior of the float limit means 45 and it has a hollow cylindrical portion 58 that permits it to move or slide over an encapsulated magnetic reed switch 60.

The magnetic reed switch 60 is attached to the upper housing 40 by solder connection 62. A conductor 66 is also connected to the magnetic reed switch 60 and passes through an insulator 44 and eyelet connector 68. A solder joint 70 seals the space between the eyelet connctor 68 and the conductor 66. The conductor 66 is attached to the conductor 30 by a solder connection 74 formed at the eyelet connector 76 which is housed in the insulator 78. The insulator 78 is supported in the lower casing 36 and is sealingly secured therein by a washer seal 80.

It should be noted that the lower casing 36, the inner casing 38 and the outer casing 40 are axially aligned and that the magnetic reed switch 60 lies substantially on this axis. This permits the sensing means or magnetic float 50 to readily be guided in its floating movement by the encapsulated portion of the magnetic reed switch 60. It is also apparent from the preceding description that a circuit is completed from the conductor 30 to ground via conductor 66, magnetic reed switch 60 and the housing 34.

A system for sensing the level of a liquid and including the transducer 24 described in detail above is shown in FIGURE 3. This system includes a voltage source 82 such as a battery or an alternator. This battery 82 is connected to the magnetic reed switch 60 via a switch 84 and an indicating means or warning lamp 86. The magnetic reed switch 60 includes a pair of normally open contacts 88 which are connected to ground via the conductor 28. The contacts 88 are closed when the float means 50 assumes the position shown in FIGURE 2. Normally the liquid suspends the float in the proximity of the upper float limit 48.

In operation, when the push button 84 is closed and the level of the liquid or fluid 20 is as indicated in FIGURE 3, the permanent magnet means 54 will be positioned above the normally open contacts 88 by the float 52. With the contacts 88 open, the warning lamp 86 will remain de-energized. When the level of the fluid 20 falls below the contacts 88, the permanent magnet 54 will move downwardly closing the normally open contacts 88 when aligned with the contacts. The closing of the contacts 88 completes a circuit from the battery 82 through the warning lamp 86 and the closed contacts 88 to ground. This energizes and illuminates the warning lamp 86 informing the operator that a selected fluid level has been reached.

It should be understood that the transducer 24 may indicate a low liquid level, an intermediate liquid level or a high liquid level. For example, in the case of a high liquid level transducer, the permanent magnet 54 would be aligned with the normally open contacts 88 when the float 52 abuts the upper limit means 48 (FIGURE 2) and when the liquid falls below the selected high level the float 52 would descend to the lower limit means 46 permitting the contacts 88 to open. A plurality of transducers 24 may be utilized to indicate various liquid levels.

An alternative embodiment of the system described above is shown in FIGURE 4. This system in addition to all the elements shown in FIGURE 3 includes the additional element of a time delay means or a resistor means 90 such as a thermistor having a negative temperature coefficient of resistance. This resistor means 90 is connected in circuit to the warning lamp 86 and to the transducer 24. The resistor means 90 performs two useful functions. It functions to prevent the warning lamp 86 from displaying any false signals when the tank 10 is temporarily tilted in such a position that the liquid level is altered and magnetic float means 50 descends and closes the contacts 88. The resistor means 90 also functions in rapidly fluctuating or pulsating systems to prevent the warning lamp 86 from displaying a signal unless the average position of the magnettic float means 50 is below the selected liquid level for a given period of time. The resistor means 90 performs this function by initially presenting a high resistance to the flow of current through the warning lamp 86 assuming that the contacts 88 are closed. This initial high resistance of the resistor means 90 maintains the current below the level required to illuminate the warning lamp 86. If the contacts 88 remain closed for a given period of time, the temperature of the resistor means or thermistor 90 will rise and its resistance will fall. When the resistance of the thermistor 90 falls to a given level, the current through the warning lamp 86 will sufficiently increase so that the warning lamp 86 is illuminated. It can be seen that in the case of a motor vehicle, when the vehicle is momentarily climbing a hill and the liquid level in such components as the fuel tank, the radiator and the crankcase is altered, a false or misleading warning lamp signal will be prevented. Proper placement of the transducer 24 may prevent such misleading signals, but such location is not always possible.

Another alternative embodiment of a liquid level sensing system specifically adapted for use in an automotive vehicle is shown in FIGURE 5. This system comprises an ignition switch 94 having a start position contact 96 and an on position contact 98. The start position contact 96 is connected in circuit with a pair of normally closed contacts 100 which are in turn electrically connected to the warning lamp 86 that is connected to ground. The on position contact 98 is in circuit with a pair of normally open contacts 102 that are connected to ground via the warning lamp 86. The on position contact 98 is also connected to a relay coil 104 which is connected in circuit with the normally open contacts 88 of the magnetic reed switch 60. The normally open contacts 88 are connected to ground by the conductor 28 or the casing 34. The relay coil 104 when energized is adapted to close the contacts 102 and to open contacts 100. The closing of contacts 102 completes a circuit from the on position contact 98 to the warning lamp 86. The opening of contacts 100 prevents the completion of a circuit from the battery to start position contact 96 and to the starter.

In operation the switch arm 97 is initially connected to the start position contact 96 to start the motor vehicle. When this occurs the battery 82 is connected to the warning lamp 86 via the normally closed contacts 100. With this circuit completed, the warning lamp 86 will be illuminated indicating that it is functioning. With the vehicle operating, the switch arm 97 is returned to contact the on position contact 98. This completes a circuit from the battery 82 to the coil 104 and to normally open contacts 88 of the magnetic reed switch 60. When the magnetic float means 50 moves to a given level, the normally open contacts 88 will close and a circuit will be completed through the contacts 88 to ground. The completing of the circuit to ground causes the coil 104 to be energized which in turn opens the normally closed contacts 100 and closes the normally open contacts 102. The closing of the normally open contacts 102 results in a circuit being completed from the battery 82 through the warning lamp 86 to ground. This energizes the warning lamp 86 indicating that the selected liquid level has been reached.

Another alternate embodiment is shown in FIGURE 6. This circuit comprises a battery 82 connected to the switch arm 97 of the ignition switch 94. The switch arm 97 is adapted to make contact with the on position contact 98. The on position contact 98 is connected to the warning lamp 86 via the normally open contacts 102. A relay coil 104 that is adapted to close the contacts 102 is connected to the on position contact 98. The normally open contacts 88 of the magnetic reed switch 60 are connected in circuit with the relay coil 104. A thermistor or resistor means 106 having a positive temperature coefficient of resistance is also connected to the relay coil 104 and to ground. The thermistor 106 initially has a relatively low resistance readily permitting current to flow through it and the relay coil 104. As the current flows through this thermistor 106 it is heated and its resistance increases to a very large value. With the resistance at this very large value the temperature of the thermistor 106 will stabilize.

In operation, when the switch arm 97 is connected to the on position contact 98, a circuit is completed from the battery 82 through the relay coil 104 and the thermistor 106 to ground. The current initially flowing through this circuit is sufficient to energize the relay coil so that contact 102 is momentarily closed. The closing of contact 102 completes a circuit from the battery 82 through the warning lamp 86 to ground. The completion of this circuit enables the operator to determine whether the warning lamp 86 is functioning. With the current flowing through the thermistor 106, its resistance will soon increase to the point that the current flowing through the relay coil 104 becomes insignificant thereby de-energizing the relay coil 104. The contacts 102 will then open and the warning lamp 86 will be de-energized. The system will be maintained in this condition until the magnetic float means 50 of the transducer 24 moves to such a level that the contacts 88 are closed and a circuit is completed from the battery 82 through the relay coil 104 to ground. The completing of this circuit will cause the relay coil 104 to close the normally open contacts 102, thereby energizing the warning lamp 86. Illumination of the warning lamp 86 indicates that the selected liquid level has been reached.

In some of the circuits described above, an element having a relatively high resistance such as the coil 104 is placed in series to aid in limiting the current flowing through the reed switch 60. This allows contacts having a relatively low current carrying capacity to be utilized.

It should be apparent from the above detailed description that an improved transducer and liquid level indicating system has been provided. The described system is simple, compact, reliable and safe.

It will be understood that the invention is not to be limited to the exact construction shown and described and that various changes and modifications may be made without departing from the spirit and scope of the invention, as defined in the appended claims.

I claim:

1. In a vehicle having a fluid reservoir wherein the fluid level varies and an ignition switch having a start position and an on position, the combination comprising an indicating means for indicating when the fluid in the reservoir reaches the selected level, a pair of normally closed contacts coupled to said start position and to said indicating means, a pair of normally open contacts operatively coupled to said on position and said indicating means, a relay coil means operatively coupled to said on position for operating said normally open contacts and said normally closed contacts, a magnetic reed switch operatively coupled to said relay coil and adapted to complete a circuit to said coil when actuated and a magnetic float means for actuating said magnetic reed switch, said magnetic float means surrounding said magnetic reed switch and adapted to move over said magnetic reed switch when the fluid reaches a selected level.

2. In a vehicle having a fluid reservoir wherein the fluid level varies and an ignition switch having an on position, the combination comprising an indicating means for indicating when a given fluid level is sensed, said indicating means operatively coupled to said on position, a pair of normally open contacts operatively coupled to said on position and to said indicating means, a relay coil operatively coupled to said on position and adapted to close said normally open contacts, a magnetic reed switch operatively coupled to said relay coil and adapted to complete a circuit to said coil when actuated, a magnetic float means for actuating said magnetic reed switch, said magnetic float means adapted to move over said magnetic reed switch when the fluid reaches a selected level and a resistor means for momentarily completing an energizing circuit to said relay coil, said resistor means having a positive temperature coefficient resistance and operatively coupled to said relay coil.

References Cited by the Examiner
UNITED STATES PATENTS

| | | | |
|---|---|---|---|
| 1,497,712 | 6/1924 | Crandall et al. | 200—84 |
| 1,723,172 | 8/1929 | Huggins | 73—313 |
| 1,943,011 | 1/1934 | Fryar | 200—84 |
| 2,329,502 | 9/1943 | Withrow | 340—59 |
| 2,533,287 | 12/1950 | Schmitt | 317—141 X |
| 2,586,449 | 2/1952 | Whitten | 73—308 X |
| 2,756,410 | 7/1956 | Tobias | 340—244 X |
| 2,885,604 | 5/1959 | Stavrinaki | 317—141 X |
| 2,892,051 | 6/1959 | Moore | 200—81.9 |
| 2,927,176 | 3/1960 | Auld et al. | 73—290.1 |
| 3,155,792 | 11/1964 | Werts | 200—87.3 |

ISAAC LISANN, *Primary Examiner.*

H. N. HAROIAN, *Assistant Examiner.*